United States Patent

Tomalia

[15] 3,697,537
[45] Oct. 10, 1972

[54] 2-(ARYLOXY)-2-THIAZOLINIUM COMPOUNDS

[72] Inventor: Donald A. Tomalia, Midland, Mich.

[73] Assignee: The Dow Chemical Company, Midland, Mich.

[22] Filed: Oct. 2, 1967

[21] Appl. No.: 671,957

[52] U.S. Cl..............260/306.7, 260/455 R, 424/270
[51] Int. Cl................................................C07d 91/24
[58] Field of Search....................................260/306.7

[56] References Cited

UNITED STATES PATENTS

| | | | |
|---|---|---|---|
| 3,108,114 | 10/1963 | Krespan | 260/307 |
| 3,551,417 | 12/1970 | Symon et al. | 260/307 |
| 3,247,220 | 4/1966 | Ham | 260/307 |

OTHER PUBLICATIONS

Gembitskii et al., Russian Chem. Reviews, Vol. 35, page 114 (1966) (Eng. Ed.)
Iwakura et al., J. Org. Chem., Vol. 32, pages 2362–2364 (1967)

*Primary Examiner*—Alton D. Rollins
*Attorney*—Griswold & Burdick, John L. Spalding and Theodore Post

[57] ABSTRACT

2-(Aryloxy)-2-thiazolinium hydrochlorides (A) and chlorides (B), useful as pesticides, are prepared by reacting, for (A) compounds, an N-unsubstituted aziridine with an aryloxy-thiocarbonyl chloride; and by reacting, for (B) compounds, an N-alkyl- or an N-arylaziridine with an aryloxy-thiocarbonyl chloride. The 2-(aryloxy)-2-thiazolines are liberated from their thiazolinium hydrochlorides by reaction with aqueous base.

9 Claims, No Drawings

2-(ARYLOXY)-2-THIAZOLINIUM COMPOUNDS

This invention concerns the preparation of new organic compounds, 2-(aryloxy)-2-thiazolinium hydrochlorides and chlorides, by refluxing aziridine, a 2-, 2-, or a 2,3-substituted aziridine with an aryloxythiocarbonyl chloride. The corresponding 2-thiazolinium hydrochloride results when an N-unsubstituted aziridine co-reactant is used, while a 2-thiazolinium chloride results when one of the same thiocarbonyl chlorides is refluxed with an N-substituted (1-substituted) aziridine co-reactant, which may be substituted also in the 2-, 2-, or 2,3-positions.

In the process of this invention, an aryloxythiocarbonyl chloride having the formula R-O-C(S)Cl, wherein R represents a phenyl group which may have one to three substituents of the group of F, Cl, Br, $NO_2$, $OCH_3$ or CN, is reacted with an aziridine having the formula $NR^3—CR^5R^5—CHR^4$, wherein $R^3$ represents H (when a thiazolinium hydrochloride is desired), or phenyl, one to four carbon alkyl, aralkyl, i.e., aryl (one to four carbon alkyl) wherein aryl is phenyl or naphthyl, when a thiazolinium chloride is desired and $R^4$ and $R^5$ individually represent H, phenyl, and one to four carbon alkyl, in either case, whereby thiazolinium hydrochlorides or thiazolinium chlorides are formed. The reaction is represented by the following equation:

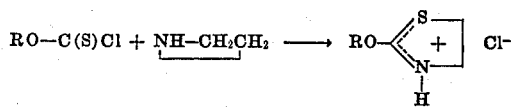

wherein R has the significance indicated above.

The reaction between the aryloxythiocarbonyl chloride with an aziridine to form a 2-thiazolinium hydrochloride or chloride is carried out by heating the reactants at a temperature ranging between ca. 75° and 150°C., advantageously in the presence of one or more aprotic non-reactive solvents such as chlorinated hydrocarbons, e.g., carbon tetrachloride, methylchloroform and chlorobenzene and aliphatic nitriles such as acetonitrile and propionitrile, since the reaction is exothermic, advantageously by gradual or dropwise addition of a solution of the aziridine in such a solvent to a stirred solution of the aryloxythiocarbonyl chloride in such a solvent. The addition is carried out over a period of time sufficient to add the aziridine, usually up to about one hour, followed by refluxing the reaction mixture with stirring at ca. 75°–150°C. for an additional period of time sufficient to form the desired reaction product. The progress of the reaction can be followed spectroscopically. It is substantially completed, usually, in up to about two hours. After cooling the reaction mixture to room temperature, solid product is filtered off. It is recrystallized from an appropriate solvent or mixture of solvents, depending upon the solubility of the product, such as a mixture of diethyl ether and methylene chloride, or acetonitrile. Alternately, some products can be slurried with acetone and filtered. The acetone dissolves impurities. Products are identified by carbon, hydrogen and nitrogen analyses and by nuclear magnetic resonance (n.m.r.) and infrared (IR) spectra confirmation. The 2-thiazoline free base is liberated from the 2-thiazolinium hydrochloride by reaction with an equimolar proportion of an aqueous base, e.g., an alkali metal carbonate, bicarbonate or hydroxide, followed by extraction of the aqueous mixture with diethyl ether or other solvent in which the product is soluble, removal of solvent from the extract phase and distillation to recover product.

The amounts of the reactants to be employed are not critical, some of the desired product being obtained when employing any amount of said reactants. The reaction consumes the reactants in substantially equimolar proportions and the use of the starting materials in such proportions is preferred.

Representative of the aryloxythiocarbonyl chlorides useful in the practice of this invention are phenoxythiocarbonyl chloride, 3,4-dichlorophenoxythiocarbonyl chloride, 2,4,5-trichlorophenoxythiocarbonyl chloride, 2,6-dichlorophenoxythiocarbonyl chloride and such of their analogs as described above.

Representative of the aziridines useful in the practice of this invention are aziridine, 1-phenylaziridine, 1-ethylaziridine, 1-phenethylaziridine, 2,2-dimethylaziridine, 2,2-diethylaziridine and 1-ethyl-2,2-dimethylaziridine.

The following examples describe completely representative specific embodiments and the best modes contemplated by the inventor for carrying out the inventive embodiments of the process and products hereinafter claimed.

Example 1 2-Phenoxy-2-thiazolinium hydrochloride

To a stirred solution of phenoxythiocarbonyl chloride (17.25 g., 0.10 mole) in 100 ml. of carbon tetrachloride was added dropwise a solution of aziridine (4.3 g., 0.10 mole) in 25 ml. of the same solvent. The addition was carried out over a period of one-half to 1 hour during which time an exotherm was observed. The reaction mixture was refluxed for 1—2 hours at about 80°C. while stirring. After cooling to room temperature, the solid was filtered off. A melting point determination gave an m.p. of 150°–155°C. Recrystallization from a mixture of diethyl ether and methylene chloride gave an analytical sample of white crystals melting at 160°–163°C. The n.m.r. spectrum was consistent with the proposed structure. The IR spectrum displayed a characteristic band at 1736 cm⁻¹

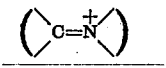

A nitrogen analysis for $C_9H_9NOS.HCl$ gave: Calc. Nitrogen: 6.50 percent Found Nitrogen: 6.27 percent.

Example 2 2-Phenoxy-2-thiazoline

The free base of the product of Example 1 was obtained by adding 11.4 g., 0.053 mole, of 2-phenoxy-2-thiazolinium hydrochloride to a stirred solution of sodium hydroxide (2.1 g., 0.053 mole, in 55 ml. of water) in small portions. A light yellow oil separated. The aqueous mixture was extracted with 3 × 75 ml. of diethyl ether, the combined extracts were dried over anhydrous $MgSO_4$ followed by removal of the solvent by use of vacuum at room temperature. The product was obtained as a light yellow oil. Distillation of this material gave pure product, b.p. 124°–125°C./1.5 mm. The n.m.r. and IR spectra were consistent with the structure

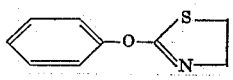

Example 3 3-Ethyl-2-phenoxy-2-thiazolinium chloride

A solution of 1-ethylaziridine (7.1 g., 0.10 mole) in 25 ml. of methylchloroform was added dropwise to a stirred solution of phenoxythiocarbonyl chloride (17.25 g., 0.10 mole) in 100 ml. of the same solvent. The addition was made over a period of one-half hour and was accompanied by a moderate exothermic reaction. A substantial amount of white solid precipitated out during this time. After refluxing for 3 hours the reaction mixture was cooled and filtered in a dry box. A tan crystalline product was obtained which had a m.p. of 145°–150°C. This material was hygroscopic and had to be handled under anhydrous conditions. Recrystallization from 95 percent ethanol gave nice white plates, m.p. 149°–150.5°C. The IR spectrum showed a characteristic absorption band at ~1740 cm$^{-1}$

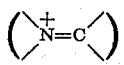

and the n.m.r. spectrum exhibited a pattern which was consistent with the product 3-ethyl-2-phenoxy-2-thiazolinium chloride. Elemental analysis indicated the salt was a monohydrate. Analysis for $C_{11}H_{14}Cl NOS \cdot H_2O$:
Calc.: C, 50.5 percent; H, 6.15 percent; N, 5.35 percent.
Found: C, 50.6 percent; H, 6.00 percent; N, 5.31 percent.

Example 4 3-Phenethyl-2-phenoxy-2-thiazolinium chloride

In a similar manner as described in Example 3, the above compound was prepared by reacting 1-phenethylaziridine (14.7 g., 0.10 mole) with phenoxythiocarbonyl chloride (17.25 g., 0.10 mole). The crude product was obtained as tan, hygroscopic crystals, m.p. 133°–135°C. Recrystallization from 95% ethanol gave a white crystalline product, m.p. 142°–143°C. The IR spectrum displayed a characteristic absorption band at ~1735 cm$^{-1}$

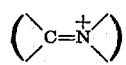

Elemental analysis indicated the salt was obtained as a monohydrate. Analysis for $C_{17}H_{18}Cl NOS \cdot H_2O$:
Calc.: C, 60.43 percent; H, 5.96 percent; N, 4.14 percent.
Found: C, 60.70 percent; H, 5.84 percent; N, 4.12 percent.

Example 5 2-(3,4-Dichlorophenoxy)-thiazolinium hydrochloride

The procedure of Example 1 was repeated, using as reactants 3,4-dichlorophenoxythiocarbonyl chloride, 0.075 mole, and aziridine, 0.075 mole, dissolved, respectively, in 200 ml. and in 100 ml. of acetonitrile. An immediate exothermic reaction raised the temperature of the reaction mixture to 68°C. The reaction mixture was thereafter heated to reflux and refluxed for 25 minutes. At this time a white gelatinous solid suddenly separated and set up solid. Heat was removed and the reaction flask was immersed in an ice bath. The resulting crystals were collected on a filter, air dried and recrystallized from acetonitrile to give white crystals having a m.p. of 159°–160°C. N.m.r. and IR spectra confirmed the structure for the above stated product.

Example 6 2-(3,4-Dichloro-phenoxy)-3-(2-phenethyl)-thiazolinium chloride

The procedure of Example 5 was repeated, using as reactants 3,4-dichlorophenoxythiocarbonyl chloride, 0.075 mole, and N-phenethylaziridine, 0.075 mole. After crystallization from nitromethane, the white product melted at 120°–120.5°C. N.m.r. confirmed the structure for the above stated product, a definite peak for water being observed. Combustion analysis checked for the monohydrate. Analysis for $C_{17}H_{16}Cl_3 NO_5 \cdot H_2O$:
Calc.: C, 50.20 percent; H, 4.46 percent; N, 3.44 percent.
Found: C, 49.8 percent; H, 4.37 percent; N, 3.38 percent.

Example 7 2-(2,4,5-Trichlorophenoxy)-3-(2-phenethyl)-thiazolinium chloride

The procedure of Example 5 was repeated, using as reactants 2,4,5-trichlorophenoxythiocarbonyl chloride, 0.075 mole, and N-phenethylaziridine, 0.075 mole, and acetonitrile as solvent. Product crystals were filtered, washed with toluene and acetonitrile and a m.p. of 198°–199°C. determined. N.m.r. and IR spectra were consistent with the above stated product.

Example 8 2-(2,6-Dichlorophenoxy)-3-(2-phenethyl)-thiazolinium chloride

The procedure of Example 5 was repeated, using as reactants 2,6-dichlorophenoxythiocarbonyl chloride, 0.075 mole, and N-phenethylaziridine, 0.075 mole. After overnight cooling, the reaction flask contents were solid. $CCl_4$ was added to the greasy product, and after filtration the solids were slurried with acetone, filtered, dried, and a m.p. of 172°–173°C. was determined. The n.m.r. spectrum was consistent with the above stated product.

The products of the present invention are useful as pesticides. In such applications, the unmodified products can be used as such. Generally, it is preferred to use the products of this invention in the form of a composition comprising one or more products and one or more aids or adjuvants, such as water, organic solvents, surfactants, inert, particulate solids, and the like. The products of this invention are also useful in aerosol compositions.

In representative operations, a solution of 50 ml. of water containing 50 p.p.m. of the compound of Example 2 was prepared and to it was added about 50 3-day old yellow fever mosquito larvae. After 3 days' exposure, a 98 percent kill of the larvae was observed. In the absence of toxicant, a control showed no kill of larvae.

A series of culture media heavily infested with ova of Haemonchus spp., Trichostrongylus spp., Cooperia spp., Ostertagia spp., Esophagostomum spp. and Bunostomum spp., derived from feces of infested calves, were prepared. Half of the culture media contained 300 p.p.m. of the compound of Example 4, the other half serving as control. The cultures were incubated at 26°–28C. for 5 days, then examined microscopically for living larvae. The percent kill for the cultures containing the test compound was 100 percent. The control was heavily infested with larvae of the named species.

What is claimed is:

1. A 2-thiazolinium compound of the group consisting of 2-phenoxy-2-thiazolinium hydrochloride, 3-ethyl-2-phenoxy-2-thiazolinium chloride, 3-phenethyl-2-phenoxy-2-thiazolinium chloride, 2-(3,4-dichlorophenoxy)-thiazolinium hydrochloride, 2-(3,4-dichlorophenoxy)-3-(2-phenethyl)-thiazolinium chloride, 2-(2,4,5-trichlorophenoxy)-3-(2-phenethyl)-thiazolinium chloride and 2-(2,6-dichlorophenoxy)-3-(2-phenethyl)thiazolinium chloride.

2. A 2-thiazoline compound which is 2-phenoxy-2-thiazoline.

3. The compound of claim 1 which is 2-phenoxy-2-thiazolinium hydrochloride.

4. The compound of claim 1 which is 3-ethyl-2-phenoxy-2-thiazolinium chloride.

5. The compound of claim 1 which is 3-phenethyl-2-phenoxy-2-thiazolinium chloride.

6. The compound of claim 1 which is 2-(3,4-dichlorophenoxy)-thiazolinium hydrochloride.

7. The compound of claim 1 which is 2-(3,4-dichlorophenoxy)-3-(2-phenethyl)-thiazolinium chloride.

8. The compound of claim 1 which is 2-(2,4,5-trichlorophenoxy)-3-(2-phenethyl)-thiazolinium chloride.

9. The compound of claim 1 which is 2-(2,6-dichlorophenoxy)-3-(2-phenethyl)-thiazolinium chloride.

* * * * *